June 4, 1963 M. J. SHOEMAKER 3,092,442
TREATMENT OF AIR WITH ODOR REDUCTION
Filed May 5, 1961
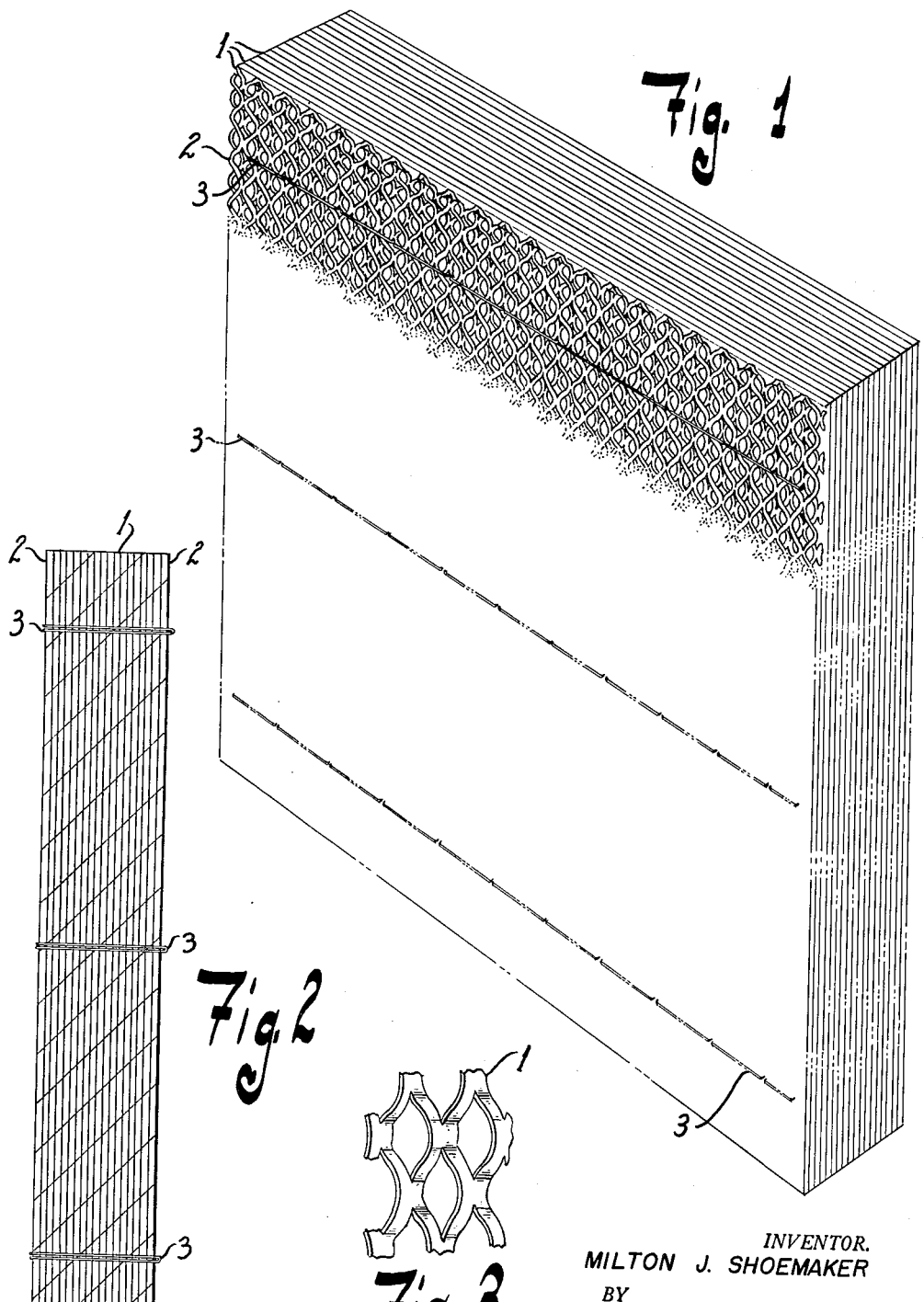
INVENTOR.
MILTON J. SHOEMAKER
BY
Andrus & Starke
Attorneys 3,092,442
TREATMENT OF AIR WITH ODOR REDUCTION
Milton J. Shoemaker, Madison, Wis., assignor to Research Products Corporation, Madison, Wis., a corporation of Wisconsin
Filed May 5, 1961, Ser. No. 107,978
9 Claims. (Cl. 21—53)

This invention relates to treatment of air with odor reduction, and more particularly to retardation of odors arising in water-wicking gas-liquid contact pads through which air passes.

During recent years, evaporative cooling devices have become popular in dry regions. These devices utilize a water-wetted contact pad or the like in which the hot, dry air is cooled and humidified. By this method it is usually possible to drop the air temperature by 20° F. or more, while at the same time increasing the humidity to more healthful levels, both for humans and animals, as well as for plants and other living things.

Many types of evaporative cooling devices have been developed which utilize a gas-liquid contact unit of some sort held in position by any of a number of means, which is water-wetted and through which air is forced by a fan or the like.

U.S. Patent No. 2,637,540, assigned to a common assignee, discloses such a device wherein a gas-liquid contact unit is positioned in a suitable frame. Water drips down onto the unit from a gutter-like trough and spreads therethrough. A fan forces air through the unit for cooling and humidifying purposes. Any water which drips from the bottom of the contact unit may be collected in a sump or the like and recirculated, if desired.

A number of different pad constructions are disclosed in that patent. Basically, the pad comprises a plurality of superposed, expanded sheets of water-absorbent character, said sheets being formed by cutting spaced, staggered slits and then expanding the sheet transversely of the slit length to form webs or baffles separated by openings. The sheets may be made of a water-absorbent, unbleached kraft paper which may be impregnated with a small amount of water resistant substance to improve its wet strength. An example of such substance is from 1% to 2% of polymerized melamine-formaldehyde resin, based on the dry weight of the paper.

Pads constructed from expanded paper so treated have been marketed successfully by the inventor's assignee for a number of years.

These water absorbent pads are usually reinforced, as by a sheet or sheets of generally flexible non-absorbent material. For example, metal screening or expanded metal foil may be placed between the superposed paper layers or on the outer faces thereof. Stitching, penetrating spikes or other means may be used to hold the several sheets of the flexible liquid-gas contact unit together.

The use of paper which is water-absorbent is a necessity in pads of this type since it is imperative for maximum cooling efficiency that the paper provide a good water-wicking action. Water dripping down onto the pad must spread completely therethrough, leaving no dry areas anywhere for air to pass through and not be cooled. Any water-repellant treatment of the paper must be avoided. It has been found that use of water-resistant melamine-formaldehyde resin in the percentages indicated will not affect the wicking action of the paper appreciably, and that it greatly strengthens the paper to prevent disintegration and sagging under the moisture load.

In operation of an evaporative cooling device of the general type indicated, many kinds of debris tend to accumulate in the pads. These may comprise flying and crawling insects, dust, bird feathers and various foreign particles and objects. Less visible are the micro-organisms of all kinds which exist in the air and local water supply and which gather on and in the pad and flourish in the aerobic environment. Slime and the products of decay may, and often do, develop. In addition, objectionable odors develop and actual clogging occurs, which necessitate cleaning of the pad.

Sometimes, if conditions are too severe, the pad will disintegrate or rot away. This was found to be due to growths of micro-organisms which usually initially developed in localized areas, but then spread throughout the pad to form a gelatinous, slimy mass.

In addition, it has long been observed that algae will form on the metal parts and gutters of the cooler frame, regardless of the type of pad used. Sometimes the algae growths would slough off and slide down onto the pad and cause the latter to disintegrate, as well as creating foul odors.

Over a period of years, tests have repeatedly shown that the expanded kraft paper pad is somewhat less prone to produce objectionable odors than pads made from aspen wood excelsior, even though the latter, when fresh, is essentially odorless. At first it was thought that this phenomenon would seem to be due to removal of wood sugars from the pulp in the kraft process, since these materials would readily serve as food for certain micro-organisms.

The unbleached kraft pulp used for the superposed, expanded sheets forming the gas-liquid contact pads contains about 83% alpha cellulose and from 7% to 8% or more lignin. In the beater, the pulp is treated with from 1% to 2% of the melamine-formaldehyde resin, which increases the tensile strength without noticeably decreasing wicking action. Urea-formaldehyde or other equivalent resins might also be used.

This addition of resin apparently reduces the odor to some extent in the paper pads. Such a concept is believed to be borne out by an article which shows that melamine-formaldehyde resin greatly increases the microbiological resistance of impregnated cotton cloth. (See: W. L. White and R. G. H. Siu, Industrial Engineering Chemistry, vol. 39, p. 1628 (1947).)

Nevertheless, objectionable odors have still occurred in some situations with gas-liquid contact pads, and the problem of slime buildup had not been solved heretofore.

The present invention is based on the discovery that a gas-liquid contact pad may be manufactured so that the air emanating from the pad will be practically odorless and the pad will be substantially free from growth of micro-organisms, while still maintaining its necessary water absorbency and wicking properties. This is accomplished in the case of the expanded kraft paper pad by the treatment of the pulp in the paper-making process with limited quantities of a solubilized emulsion form of copper-8-quinolinolate.

While expanded paper pads have been primarily referred to above, the invention may be applied to aspen wood excelsior pads usually enclosed in an open mesh fabric.

In addition, the invention may be utilized in connection with pads of plastic foam with open mesh readily permeable to air, provided that they are made to wet readily and wick water. A mineral composition, such as that disclosed in U.S. Patent No. 2,955,064 and assigned to a common assignee, may be used to coat the plastic foam to improve water wicking characteristics. The coated foam bodies may have incorporated therein copper-8-quinolinolate in sufficient amount to keep the air passing through comparatively free of odor. If desired, the copper-8 composition may be incorporated directly in the wet mineral slurry for application to the foam sheet as a coating.

The accompanying drawing illustrates a structure in accordance with the best mode of the invention presently contemplated by the inventor.

In the drawings:

FIGURE 1 is a perspective view of a gas-liquid contact unit constructed in accordance with the concept of the invention;

FIG. 2 is a transverse sectional view of the contact unit of FIGURE 1; and

FIG. 3 is an enlarged fragmentary view of an expanded paper sheet employed in the contact unit.

As shown in FIGS. 1 and 2 of the drawings, the gas-liquid contact unit may comprise an interstitial filter body having a plurality of superposed layers 1 of expanded open-mesh kraft paper, bound and supported on each side by an expanded open-mesh layer 2 of metal foil. The layers 1 and 2 may be secured together by suitable stitching 3. FIG. 3 shows the construction of each layer 1 in detail, the same construction being applied to each layer 2.

Other forms of supporting layers and securing means, such as those indicated in U.S. Patent No. 2,637,540, may be utilized without departing from the spirit of the invention.

The use of copper-8-quinolinolate as a preservative has long been known and has had wide application in preserving jungle clothing and the like in high humidity areas in wartime. (See: Proceedings of the Chemical Specialty Mfgs. Assn., 1951, pp. 55–60.) However, for treatment of textiles and paper, a double immersion system involving the 8-quinolinol in dilute acid was required for the first bath. (P. 56, supra.) This procedure could not be utilized in the cooling pad manufacturing process, since any appreciable acid would hydrolize the melamine-formaldehyde resin.

In addition, the use of copper-8-quinolinolate in water-absorbent pad-making seemed doomed to failure, since a water repellent treatment was deemed necessary. (P. 56, supra.) Furthermore, experience of those skilled in the art indicated that unless the paper was insolubilized (made water-repellant), the copper-8-quinolinolate would leach out of the paper in use and thus, any preservative qualities would be destroyed. Since large volumes of water would pass through the cooling pad over a period of time, the leaching action would be great.

In accordance with one facet of the invention, the cellulose pad material, which is treated with the melamine resin, is also impregnated with a water dispersion of emulsified copper-8-quinolinolate. In the case of the kraft paper pad, the dispersion may be applied at the size press in the paper-making process, which is subsequent to the melamine resin treatment, and in amounts less than about 0.25% by sheet weight.

With one type of copper-8-quinolinolate, a percentage of about 0.15% by sheet weight was introduced into the melamine resin-treated kraft paper in the form of an emulsion. Tests of this paper, after drying, indicated no significant loss of the copper-8 compound even after 96 hours of dynamic leaching in deionized water.

With another type of copper-8-quinolinolate, known in the trade as Quindex Emulsion Base and disclosed in U.S. Patent No. 2,745,832, separate samples of melamine resin-treated kraft paper were subjected to concentrations of 0.10%, 0.075% and 0.05%, respectively, by weight of the paper. In each instance, tests showed no appreciable leaching of the copper-8 compound occurred and mold resistance was excellent.

Tests of gas-liquid contact pads treated as above in commercial evaporative cooling units have shown remarkably improved results. While melamine resin-treated paper pads exhibit less odor than excelsior aspen wood pads, as stated previously, the inclusion of copper-8-quinolinolate substantially eliminates odor altogether, both in the pad and in the evaporative cooling system.

This result has been observed in spite of the normal build-up of debris previously mentioned.

In addition, the pads have exhibited remarkable resistance to growth of cellulolytic micro-organisms, and serve to protect the entire cooling system therefrom. Slime and algae do not flourish on the pad. Comparative tests in one environment show positive slipperiness of the cooling system sump within one week with an untreated pad, with no slipperiness evident in a sump with a treated pad. Furthermore, the pads have exhibited longer life.

The results obtained by the present invention are believed due at least in part to the interaction of the material used for imparting wet strength with the small amount of copper-8 added in the form of an emulsion. It is believed that a chemical complex is formed wherein the wet strength material potentiates the fungicidal characteristics of the copper compound, i.e., synergistic. In addition, in the complex, the copper-8 is held more tenaciously by the melamine resin.

The molecular complex believed to be formed may be due to the fact that the copper-8-quinolinolate is added to the melamine resin when the latter is only partially cured or polymerized. Tests have shown that the melamine resin is not fully polymerized until several weeks after paper treated with the resin alone leaves the dryer. The ultimate wet strength of the paper at the end of that period is about three times the original wet strength as the paper leaves the dryer.

It is believed that the melamine resin in its only partially polymerized condition permits a more intimate penetration by the copper-8 emulsion, thereby forming a resin-copper-8-quinolinolate complex. This results in locking the copper compound more securely against the exhaustive leaching to which the pad is exposed in service. Field tests of the pad show a high resistance to development of odors after long, continuous use, which is believed to be due to the formation of the complex.

A size press is used to apply the copper-8 to the paper, and is located near the end of the dryer. However, sufficient dryer drums remain to dry the copper-8 treated paper. The additional heat further polymerizes the melamine resin so that the treated paper leaving the apparatus has twice as much wet strength as a sheet without the copper compound.

The concept of the invention provides a significant advance in the art of treatment of air. The copper-8-quinolinolate is held in insoluble association with the pad and the leaching action of water is insignificant.

Various modes of carrying out the invention are contemplated as being within the scope of the following claims particularly pointing out and distinctly claiming the subject matter which is regarded as the invention.

I claim:

1. In the process of cooling and humidifying air, the steps comprising:
   passing air through a water-wicking liquid-gas contact pad carrying in insoluble association therewith copper-8-quinolinolate in sufficient quantity to inhibit the formation of disagreeable odors, while continuously circulating water through the pad by wicking action.

2. In the process of cooling and humidifying air, the steps comprising:
   passing air through a water-wicking cellulosic liquid-gas contact pad carrying in insoluble association therewith a complex of melamine-formaldehyde resin and copper-8-quinolinolate in sufficient quantity to inhibit the formation of disagreeable odors, while continuously circulating water through the pad by wicking action.

3. In the process of cooling and humidifying air, the steps comprising:
   passing air through a water-wicking mineral-coated liquid-gas contact pad having in the coating water insoluble copper-8-quinolinolate in sufficient quantity to inhibit the formation of disagreeable odors, while continuously circulating water through the pad by wicking action.

4. A gas-liquid contact pad for cooling and humidifying air passing therethrough and with said pad being subjectable to substantially continuous leaching action by water, said pad comprising:
a water-wicking filter body having insolubly incorporated therein copper-8-quinolinolate as an odor-retardant.

5. A gas-liquid contact pad for cooling and humidifying air passing therethrough and with said pad being subjectable to substantially continuous leaching action by water, said pad comprising:
a water-wicking filter body having insolubly incorporated therein a complex of melamine-formaldehyde resin and copper-8-quinolinolate for retarding disagreeable odors.

6. A gas-liquid contact unit comprising:
a pad of water-absorbent cellulosic material,
said material having therein a known quantity of copper-8-quinolinolate.

7. For use in an evaporative cooling system or the like, a gas-liquid contact unit comprising:
a pad of water-absorbent paper capable of acting as a wick when water is applied thereto,
said paper having therein less than about 0.25% by weight of copper-8-quinolinolate for reduction of odor and micro-organism growth,
said paper also having therein about 1% to 2% of melamine-formaldehyde resin,
whereby said paper is imparted with wet strength and resistance to leaching by water.

8. The process of making a water-wicking paper which is odor-retardent, comprising:
treating paper pulp with a resin to impart wet-strength thereto,
impregnating the treated paper with a copper-8-quinolinolate emulsion before the said resin is fully cured, and subsequently drying the paper.

9. The process of claim 8 in which the resin is selected from the group: (a) melamine-formaldehyde resin, (b) urea-formaldehyde resin.

References Cited in the file of this patent
UNITED STATES PATENTS

| | | |
|---|---|---|
| 2,808,124 | Attwood | Oct. 1, 1957 |
| 2,973,830 | Gruner | Mar. 7, 1961 |

FOREIGN PATENTS

| | | |
|---|---|---|
| 1,103,766 | France | Nov. 7, 1955 |

OTHER REFERENCES

Chem. Abs., vol. 52, p. 8281i, May-June 1958.
Chem. Abs. vol. 53, p 13613g relied upon, 1959.